(12) United States Patent
Dias et al.

(10) Patent No.: US 11,979,092 B2
(45) Date of Patent: May 7, 2024

(54) INITIALIZATION SYSTEM OF CASCADED MODULAR ENERGY CONVERTERS

(71) Applicant: WEG DRIVES & CONTROLS AUTOMACAO LTDA, Jaragua do Sul (BR)

(72) Inventors: Adriano Da Silva Dias, Jaragua do Sul (BR); Marcio Sari, Jaragua do Sul (BR)

(73) Assignee: WEG DRIVES & CONTROLS AUTOMACAO LTDA, Jaragua do Sul (BR)

( * ) Notice: Subject to any disclaimer, the term of this patent is extended or adjusted under 35 U.S.C. 154(b) by 163 days.

(21) Appl. No.: 17/904,341

(22) PCT Filed: Jun. 5, 2020

(86) PCT No.: PCT/BR2020/050202
§ 371 (c)(1),
(2) Date: Aug. 16, 2022

(87) PCT Pub. No.: WO2021/243425
PCT Pub. Date: Dec. 9, 2021

(65) Prior Publication Data
US 2023/0071239 A1    Mar. 9, 2023

(51) Int. Cl.
*H02M 5/458*    (2006.01)
*H02M 1/00*    (2007.01)
(Continued)

(52) U.S. Cl.
CPC ......... *H02M 5/458* (2013.01); *H02M 1/0009* (2021.05); *H02M 1/08* (2013.01); *H02P 27/06* (2013.01)

(58) Field of Classification Search
CPC ...... H02M 5/458; H02M 1/0009; H02M 1/08; H02M 1/0077; H02M 1/32; H02M 1/36;
(Continued)

(56) References Cited

U.S. PATENT DOCUMENTS 7,511,975 B2    3/2009    Hammond
8,159,840 B2 *  4/2012    Yun ...................... H02M 5/458
                                                    363/39
(Continued)

FOREIGN PATENT DOCUMENTS

EP    2988404 A1    2/2016

OTHER PUBLICATIONS

International Search Report for corresponding application PCT/BR2020/050202 dated Feb. 9, 2021 and English translation (7 pages).

*Primary Examiner* — David Luo
(74) *Attorney, Agent, or Firm* — LUCAS & MERCANTI, LLP

(57) ABSTRACT

A system for limiting charging current of capacitive filters of power cells of a cascaded modular power converter during the start-up period where a low-voltage power source is used, supplying a controlled power switching arrangement controlled by the general controller of the cascaded modular power converter, making it possible to limit the charging current of the capacitors of the power cells during the start-up period of the cascaded modular converter. The controlled power switching arrangement communicates with the general controller of the cascaded modular power converter over a communication channel. The communication means send the commands to start or end the start-up process of the cascaded modular converter.

12 Claims, 7 Drawing Sheets

(51) Int. Cl.
*H02M 1/08* (2006.01)
*H02P 27/06* (2006.01)

(58) Field of Classification Search
CPC ...... H02M 7/49; H02P 27/06; H02P 2207/01; Y02B 70/10
USPC .................................................. 318/504, 494
See application file for complete search history.

(56) References Cited

U.S. PATENT DOCUMENTS

| | | |
|---|---|---|
| 8,223,515 B2 | 7/2012 | Abolhassani et al. |
| 8,254,076 B2 | 8/2012 | Ledezma et al. |
| 8,736,204 B2 | 5/2014 | Sodo et al. |

\* cited by examiner

INITIALIZATION SYSTEM OF CASCADED MODULAR ENERGY CONVERTERS

CROSS REFERENCE TO RELATED APPLICATION

This application is a 371 of PCT/BR2020/050202 filed on Jun. 5, 2020, the content of which is incorporated herein by reference.

FIELD OF THE INVENTION

The present invention application is related to a system for limiting the charging current of the capacitive filters of the voltage cells of a cascaded modular energy converter during the initialization period.

The invention applies specifically to cascaded modular energy converters, which use multi-winding phase shift transformers for speed control in electric motors in alternating current.

The system has at least one multi-winding phase shift transformer, consisting of at least two primary windings, at least one main winding for connection to a voltage source in alternating current at medium voltage and at least one auxiliary winding at low voltage for connecting an auxiliary voltage source at low voltage.

The phase shift transformer also has a plurality of secondary windings to isolate the feeding from the voltage cells connected in cascade, wherein each voltage cell has a bank of multiple capacitors that are charged through a rectifier bridge.

During the initialization, there is made use of a energy switching apparatus controlled by the general controller of the cascaded modular energy converter, and fed by a voltage source at low voltage that converts the voltage from the input terminals and supplies the primary winding low voltage auxiliary with a voltage in alternating current variable in amplitude at a fixed frequency that is greater than the rated frequency of the multi-winding phase shift transformer, allowing to limit the charging current of the voltage cell capacitors during the initialization period of the cascaded modular converter.

The controlled energy switching apparatus communicates with the general controller of the cascaded modular energy converter via a communication channel. The communication medium transmits the commands to start the initialization process of the cascaded modular converter and the process shutdown command.

BACKGROUND OF THE INVENTION

In applications of energy converters for speed control in systems installed in remote locations, where there is no electrical energy distribution system available to meet the low voltage energy supply, the auxiliary primary winding feeding is made by a low voltage energy generation system with limited capacity.

During the initialization of a cascaded modular converter, it is necessary to use a strategy to limit the charging current of the voltage cell capacitors, so that the components that are in the path of these currents are not damaged or have their useful life reduced and, above all, do not overload the low voltage energy generation system connected to the auxiliary primary winding.

The initialization sequence of cascaded modular converters starts by feeding the auxiliary primary winding at low voltage for the magnetization of the multi-winding phase shift transformer and charging the voltage cell capacitors and, after the capacitors are fully charged, the auxiliary primary winding is disconnected and the medium voltage feeding is applied through the main primary winding for the operation of the cascaded modular converter.

With the voltage cell capacitors charged, the current peak in the main primary winding is attenuated at the moment of transition of the feeding from the auxiliary primary winding (low voltage) to the main primary winding (medium voltage).

One of the strategies to reduce the initialization current peak is to use low resistance elements before the low voltage auxiliary primary winding, generally using one or more resistive elements. However, the energy required for the feeding is higher, due to the joule effect losses, added by the circulation of the initialization current through the resistive elements. Another disadvantage of this strategy is the switching of contactors in series with the feeder circuit, which produces a discontinuous initialization current.

A second strategy is the use of passive elements, such as resistors and capacitors, connected in series before the low voltage auxiliary primary winding.

When energized, the capacitive elements together with the inductance of the low voltage auxiliary primary winding, form a series resonant inductor-capacitor circuit.

The circuit, in resonance, raises the voltage on the low voltage secondary windings, causing all voltage cell capacitors connected to them to be charged with a growth rate dictated by the resonance of the series resonant inductor-capacitor circuit.

The fact of using a resonant circuit has advantages and disadvantages. The advantage is that the resonant inductor-capacitor circuit raises the voltage across the auxiliary primary winding above the value supplied by the auxiliary source, allowing the source voltage to be less than the rated voltage of the auxiliary primary winding.

The disadvantage is the need to monitor the voltage in the resonant circuit, to avoid that the voltage amplitude does not exceed the value of the nominal voltage of the auxiliary primary winding. After the voltage reaches a predetermined value, a resistor is connected to make the circuit overdamped and stabilize the voltage of the auxiliary primary winding.

STATE OF THE ART

In PI0614788-7, the initialization problem is solved by means of an additional circuit, which consists of low voltage low impedance elements and two low voltage contactors connected to each winding dedicated to the initialization of cascaded modular converters. A customer low voltage auxiliary branch supplies energy to the voltage cells of the cascaded modular converter through low voltage contactors and low voltage low impedance elements connected in series to the windings magnetically coupled to a transformer core.

In U.S. Pat. No. 8,223,515, the initialization problem is solved by the use of an auxiliary primary winding spatially separated from a multi-winding phase shift transformer. Through an auxiliary source or any type of voltage source, the initialization of the capacitors of the different voltage cells occurs through this low voltage auxiliary branch.

In U.S. Pat. No. 8,736,204, a control apparatus is connected to an auxiliary three-phase winding of the multi-winding phase shift transformer, which performs the dynamic brake function, as well as the initialization of the cascaded modular converter. The dynamic braking apparatus can initialize the various voltage cells connected to the multi-winding phase shift transformer, changing the amplitude of the fundamental voltage applied to the auxiliary three-phase winding, starting with a reduced voltage amplitude, the initial current is also reduced.

The prior arts for solving the problem of initialization of cascaded modular converters do not solve the problem of the power demand of the feeding source of the auxiliary primary winding in remote locations; in these applications, the auxiliary primary winding feeding is made by an energy generation system at low voltage with reduced capacity. The operation with higher frequencies allows the power demand of the controlled energy switching apparatus to be reduced, as well as of the auxiliary source at low voltage.

It is based on this scenario that the present invention is presented.

SUMMARY OF THE INVENTION

The aforementioned objectives are fully achieved by means of an initialization system for a cascaded modular energy converter comprising at least one multi-winding phase shift transformer, the multi-winding phase shift transformer comprising at least one low voltage auxiliary primary winding, at least one medium voltage main primary winding and at least one low voltage secondary winding; at least one voltage cell connected to at least one low voltage secondary winding of the multi-winding phase shift transformer; the initialization system further comprising: at least one voltage source at low voltage connected to at least one controlled energy switching apparatus and connected to at least one low voltage auxiliary primary winding and at least one general controller having a communication channel for initialization that communicates with a controller of the controlled energy switching apparatus; the controlled energy switching apparatus provides a voltage with variable amplitude and frequency higher than the rated operating frequency of the multi-winding phase shift transformer controlled by the general controller.

Furthermore, the present invention provides an initialization system in which the controller of the controlled energy switching apparatus generates command pulses for an inverter bridge of the controlled energy switching apparatus, providing a voltage of variable amplitude between 0 to 100% of the rated value of the low voltage auxiliary primary winding voltage.

Further, in the present invention, an initialization system is provided, wherein the controller of the controlled energy switching apparatus generates command pulses for an inverter bridge of the controlled energy switching apparatus, supplying a voltage in alternating current at a fixed frequency, greater than the rated frequency of the multi-winding phase shift transformer.

Additionally, in the initialization system of the present invention, the general controller of the cascaded modular energy converter determines the start and the end of the operation of the energy switching apparatus controlled by a command through the communication channel for initialization.

Also, in the initialization system of the present invention, during working mode operation of the cascaded modular energy converter, the general controller commands the operation of multiple voltage cells for the control of an electric motor in alternating current.

Furthermore, in the now-proposed initialization system, the cascaded modular energy converter comprises at least one controller of a voltage cell that generates the control signals for controlled semiconductor switches.

Further, in the initialization system, the controlled energy switching apparatus adds the monitoring of the initialization current through current sensors.

Furthermore, in the initialization system, the rated power of the voltage source at low voltage for initialization is less than the rated power of the low voltage primary auxiliary winding used in the initialization.

Additionally, in a preferred embodiment of the present invention, in the initialization system, the controlled energy switching apparatus consists of input terminals, a three-phase rectifier bridge, comprising diodes; a bank of multiple capacitors, a direct current bus, a three-phase inverter bridge comprising controlled semiconductor switches and antiparallel diodes connected to each controlled semiconductor switch; at least one current sensor and output terminals.

Also, in a preferred embodiment of the present invention, in the initialization system, the controlled energy switching apparatus consists of input terminals, a single-phase rectifier bridge, comprising diodes; a bank of multiple capacitors, a direct current bus, a single-phase inverter bridge comprising controlled semiconductor switches and antiparallel diodes connected to each controlled semiconductor switch; at least one current sensor and output terminals.

Furthermore, in another preferred embodiment of the present invention, the controlled energy switching apparatus consists of input terminals, a single-phase rectifier bridge, comprising diodes; a bank of multiple capacitors, a direct current bus, a three-phase inverter bridge comprising controlled semiconductor switches and antiparallel diodes connected to each controlled semiconductor switch; at least one current sensor and output terminals.

Finally, in another preferred embodiment of the present invention, the controlled energy switching apparatus consists of input terminals, a three-phase rectifier bridge comprising diodes; a bank of multiple capacitors, a direct current bus, a single-phase inverter bridge comprising controlled semiconductor switches and antiparallel diodes connected to each controlled semiconductor switch; at least one current sensor and output terminals.

BRIEF DESCRIPTION OF FIGURES

The present invention is closely detailed based on the figures listed below.

DETAILED DESCRIPTION OF THE INVENTION

Figure 1:
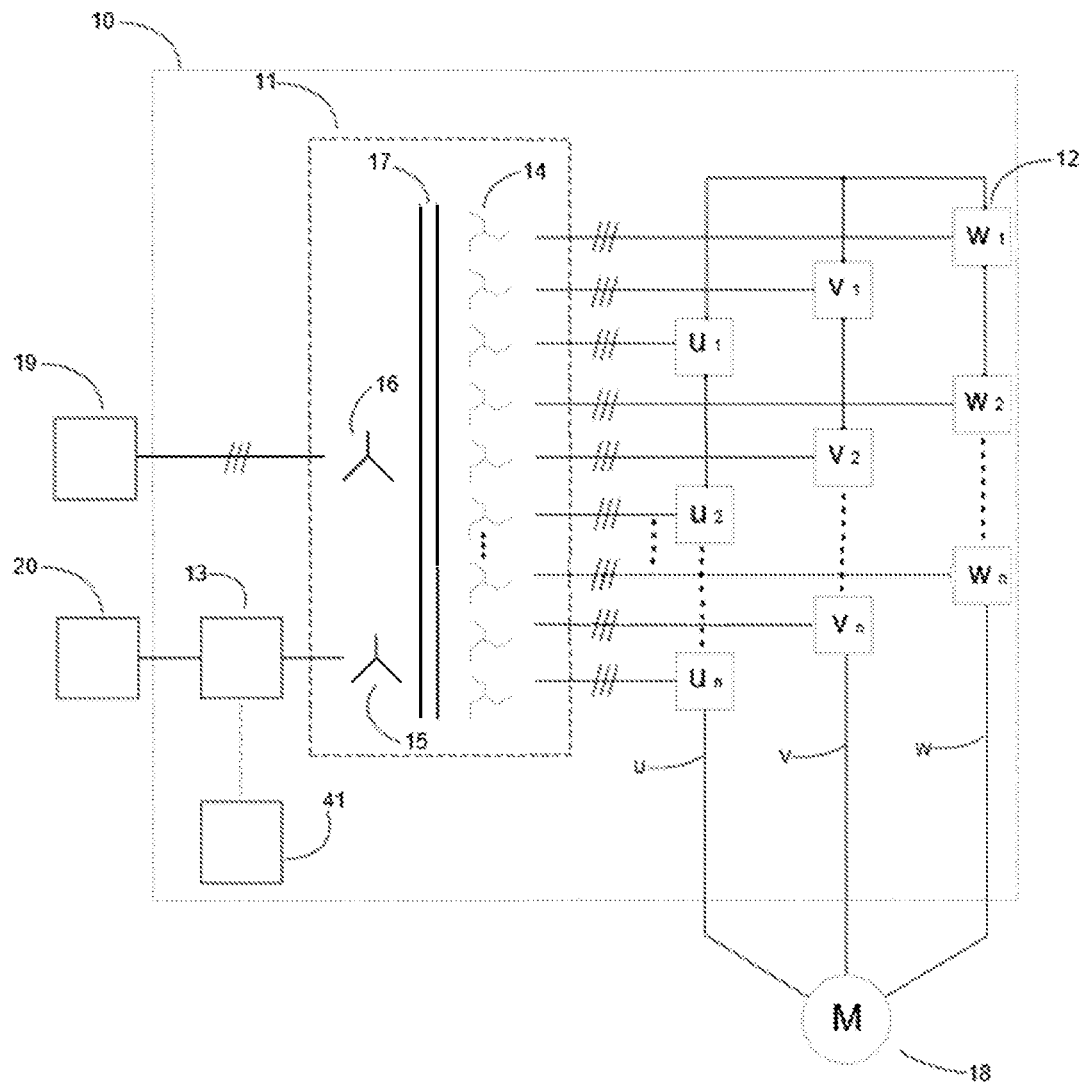
FIG. 1 illustrates an embodiment of the cascaded modular converter, object of the invention.

The descriptions and discussions that follow are presented for the purpose of deepening, not limiting the scope of the invention and will make the object of the present invention more clearly understood. Specific examples of application of the invention are also presented with the advantages achieved.

It was considered in the text that the expression low voltage refers to voltage values below 1,000 volts, and the expression medium voltage refers to voltages above 1,000 volts.

The present invention solves the current demand problem of the low voltage auxiliary primary winding (15) of the cascaded modular energy converter (10) through a controlled energy switching apparatus (13).

The controlled energy switching apparatus (13) fed by a single-phase or polyphase voltage source at low voltage (20), in alternating current, for example a motor-generator group, or in direct current, for example a bank of batteries. The controlled energy switching apparatus (13) converts the voltage of the input terminals and supplies the low voltage auxiliary primary winding (15) with a voltage in alternating current variable in amplitude, at a fixed frequency, greater than the rated frequency of the multi-winding phase shift transformer (11), allowing to limit the charging current of the capacitors of the voltage cells (12), during the initialization period of the cascaded modular energy converter (10).

The current supplied by the voltage source at low voltage (20) is rectified by the rectifier bridge (32) and filtered by the bank of multiple capacitors (33).

The controller of the controlled energy switching apparatus (37) generates command pulses for the inverter bridge (34) of the controlled energy switching apparatus (13), providing a voltage of variable amplitude, characterized by varying from 0 to 100% of the rated value of the voltage of the low voltage auxiliary primary winding (15).

Another feature of the controller of the controlled energy switching apparatus (37) is to generate command pulses for the inverter bridge (34), in such a way to produce at the output terminals (36) a voltage with a frequency greater than the rated frequency of the multi-winding phase shift transformer (11).

The general controller (41) has a communication channel for initialization (43) that, through the controller of the controlled energy switching apparatus (37), controls the operation of the controlled energy switching apparatus (13), and from the reading of some parameters defines the moment of transition from initialization mode to the working mode. In the present invention, working mode is understood as the operation of the cascaded modular energy converter (10) or the state in which the cascaded modular energy converter (10) is able to feed an electric motor in alternating current (18).

With this feature, the controlled energy switching apparatus (13) provides a voltage of controlled amplitude at a frequency greater than the rated frequency of the multi-winding phase shift transformer (11). The impedance of the initialization circuit seen by the output of the controlled energy switching apparatus (13) becomes higher, due to its dependence on frequency, and naturally, the amplitude of the output current is reduced, so that the value of current supplied by the voltage source at low voltage (20) is less than the rated frequency.

All the reactive current demanded by the multi-winding phase shift transformer (11) is supplied by the controlled energy switching apparatus (13), while the voltage source at low voltage (20) supplies only the energy for the initialization of the bank of multiple capacitors (33) of the voltage cells (12).

For operating the multi-winding phase shift transformer (11), it is necessary to supply in the auxiliary primary winding (15) a magnetizing current, purely reactive, to produce the magnetic flux in the ferromagnetic core (17).

In case the controlled energy switching apparatus (13) is not used, if the low voltage auxiliary primary winding (15) is directly connected to the voltage source at low voltage (20), this will need to supply the magnetizing current during the initialization period.

If the controlled energy switching apparatus (13) is used, due to the use of a direct current bus (44), the decoupling occurs between the input current and the output current of the controlled energy switching apparatus (13).

In this way, the magnetizing current of the multi-winding phase shift transformer (11) circulates only between the low voltage auxiliary primary winding (15) and the direct current bus (44) of the controlled energy switching apparatus (13).

The voltage source at low voltage (20) provides the energy needed to charge the capacitors of the voltage cells (12) and supply the inherent losses of the system (joule effect losses resulting from the current flow in the conductors); as a result of the decoupling, the voltage source at low voltage (20) does not need to supply the magnetizing current of the multi-winding phase shift transformer (11).

Unlike other initialization techniques, this system does not require purely resistive and/or passive elements in the initialization current path, reducing the energy required for initialization.

The solution using the controlled energy switching apparatus (13) reduces the number of components, without the need for complex connections of the passive elements.

The controlled energy switching apparatus (13) also adds the monitoring of the initialization current through current sensors (39), thus providing greater security to the initialization process.

By means of current sensors (39) one can monitor the currents in the low voltage auxiliary primary winding (15) used at initialization and, if an imbalance occurs, abort the process to avoid damage to the multi-winding phase shift transformer (11).

Another advantage of the controlled energy switching apparatus (13) together with the current sensors (39) is to monitor and control the initialization current at levels parameterized by the user. This enables the use of voltage sources at low voltage (20) of limited current capacity, and still to be able to initialize the cascaded modular energy converter (10).

In installations where the voltage source at low voltage (20) is generated by autonomous energy generation groups, with limited current capacity, limiting the initialization current of the cascaded modular energy converter (10), made possible by the controlled energy switching apparatus (13), is advantageous in not overloading the voltage source at low voltage (20).

Autonomous groups mean any low voltage energy generation system, such as a motor-generator group, a voltage source in alternating current or direct current of low voltage or other generation system that is connected to the input terminals of the controlled energy switching apparatus (13) and allowing it to function properly.

Proceeding with the detailed description, it should be understood that some of the figures and descriptions of the invention have been simplified for a clear understanding of the invention. However, because said elements are known in the art and do not facilitate a clear understanding of the invention, they have been deleted without any loss of complete understanding.

FIG. 1 presents an embodiment of the cascaded modular energy converter (10), according to the object of this invention, said cascaded modular energy converter (10) is described as consisting of at least one multi-winding phase shift transformer (11), which feeds multiple voltage cells (12) connected in cascade or series, in an arrangement that allows the synthesis in each of the phases U, V and W, a voltage that can feed an electric motor in alternating current (18), for example, a medium voltage three-phase induction motor.

Said multi-winding phase shift transformer (11) comprises at least one low voltage auxiliary primary winding (15), at least one medium voltage main primary winding (16) and multiple low voltage secondary windings (14), mounted on the same ferromagnetic core (17) that feed multiple voltage cells (12).

Said low voltage auxiliary primary winding (15) used in the initialization is fed through a controlled energy switching apparatus (13) connected to a voltage source at low voltage (20).

The operation of the controlled energy switching apparatus (13) is defined by the general controller (41) of the cascaded modular energy converter (10).

Additionally, said medium voltage main primary winding (16) is connected to a voltage source in alternating current at medium voltage (19), whose connection is made through a medium voltage contactor or circuit breaker (not shown) for the working mode operation of the cascaded modular energy converter (10).

Figure 2:
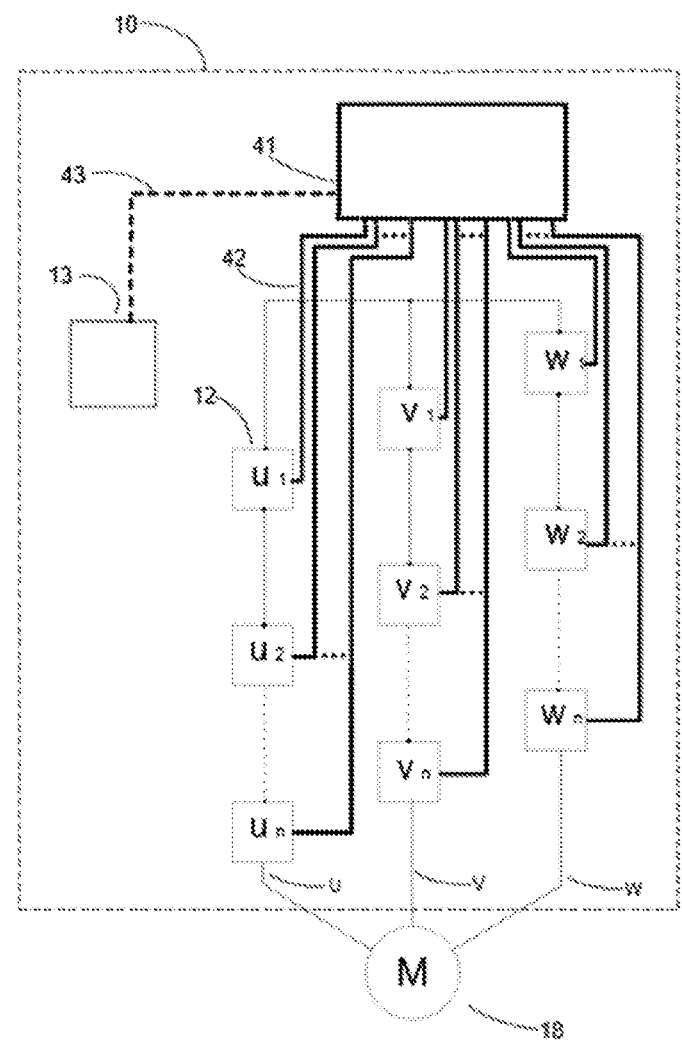
FIG. 2 illustrates a control architecture for the cascaded modular converter, object of the invention.

FIG. 2 presents the architecture of the control of the cascaded modular energy converter (10) consisting of a general controller (41) that communicates with multiple controllers of the voltage cells (12) through multiple communication channels for the voltage cells (42).

The general controller (41) of the cascaded modular energy converter (10) also communicates with the controller of the energy switching apparatus (37), through the communication channel for initialization (43) dedicated for this purpose.

For the initialization of the cascaded modular energy converter (10), the general controller (41) of the cascaded modular energy converter (10) determines the start and the end of the operation of the controlled energy switching apparatus (13) by a command via the communication channel for initialization (43).

During the working mode operation of the cascaded modular energy converter (10), the general controller (41) commands the operation of the multiple voltage cells (12) to control the electric motor in alternating current (18).

Figure 3:
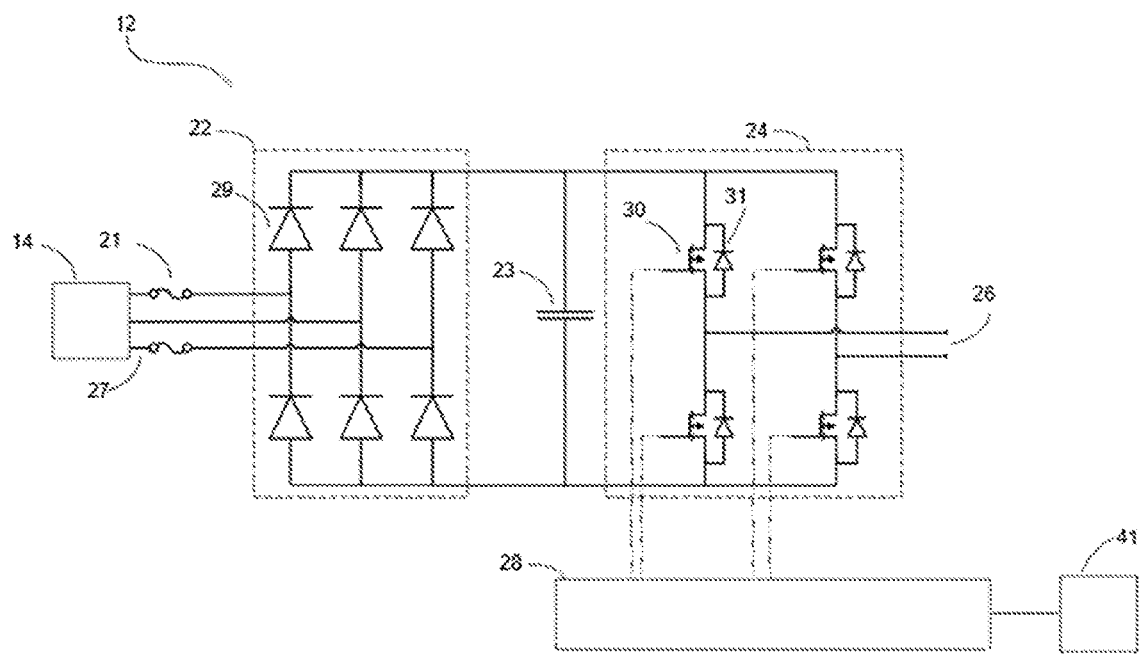
FIG. 3 illustrates an embodiment of the voltage cell for a cascaded modular converter.

FIG. 3 according to the state of the art presents an embodiment of a voltage cell (12) of a cascaded modular energy converter (10).

The feeding of the voltage cell (12) is carried out by the low voltage secondary winding (14), through the input terminals (27). To protect the voltage cell (12), the surge current protection elements (21) are used before the rectifier bridge (22).

The three-phase rectifier bridge (22) of the voltage cell (12) in this embodiment consists of six diodes (29).

The voltage supplied by the low voltage secondary winding (14) is rectified by the three-phase rectifier bridge (22) and filtered by the bank of multiple capacitors (23), connected between the output of the three-phase rectifier bridge (22) and the input of a single-phase inverter bridge (24).

The single-phase inverter bridge (24) comprises four controlled semiconductor switches (30) and four antiparallel diodes (31) connected to each controlled semiconductor switch (30). The single-phase inverter bridge (24) is connected to voltage cell output terminals (26) to enable the cascade connection of multiple voltage cells (12).

The voltage cell controller (28) generates the control signals for the four controlled semiconductor switches (30). The voltage cell controller (28) receives the command signals coming from the general controller (41) of the cascaded modular energy converter (10).

Figure 4:
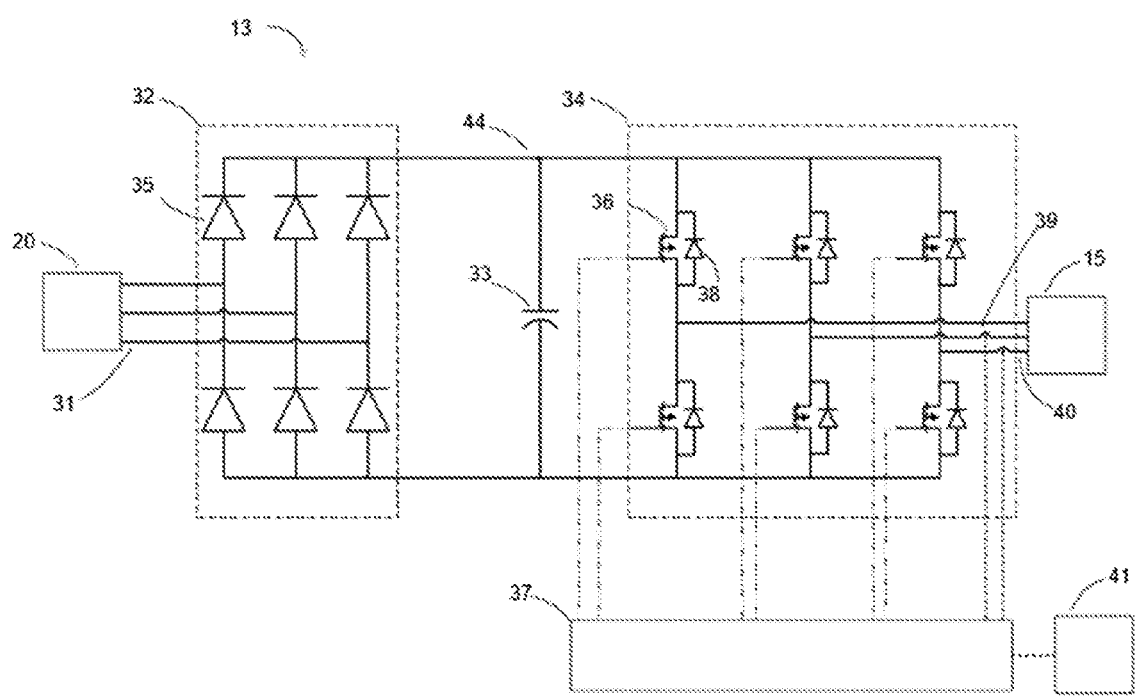
FIG. 4 illustrates the first embodiment of the controlled energy switching apparatus, object of the invention.

FIG. 4 shows a first embodiment of the controlled energy switching apparatus (13), object of this invention. The feeding is provided by connecting the voltage source at low voltage (20) to the input terminals (31).

The voltage source at low voltage (20), for this first embodiment, is a three-phase voltage source at low voltage.

The controlled energy switching apparatus (13) comprises a three-phase rectifier bridge (32) consisting of six diodes (35). The rectified voltage is filtered by a bank of multiple capacitors (33) and supplied to a three-phase inverter bridge (34) through a direct current bus (44).

The three-phase inverter bridge (34) comprises six controlled semiconductor switches (36) and six antiparallel diodes (38) connected to each controlled semiconductor switch (36). The three-phase inverter bridge (34) is connected to output terminals (40) to enable the connection to the low voltage auxiliary primary winding (15). The output current is measured by two current sensors (39), for monitoring and controlling by the controller of the energy switching apparatus (37).

The controller of the energy switching apparatus (37) generates the control signals for the six controlled semiconductor switches (36), and also receives control signals from the general controller (41) of the cascaded modular energy converter (10).

Figure 5:
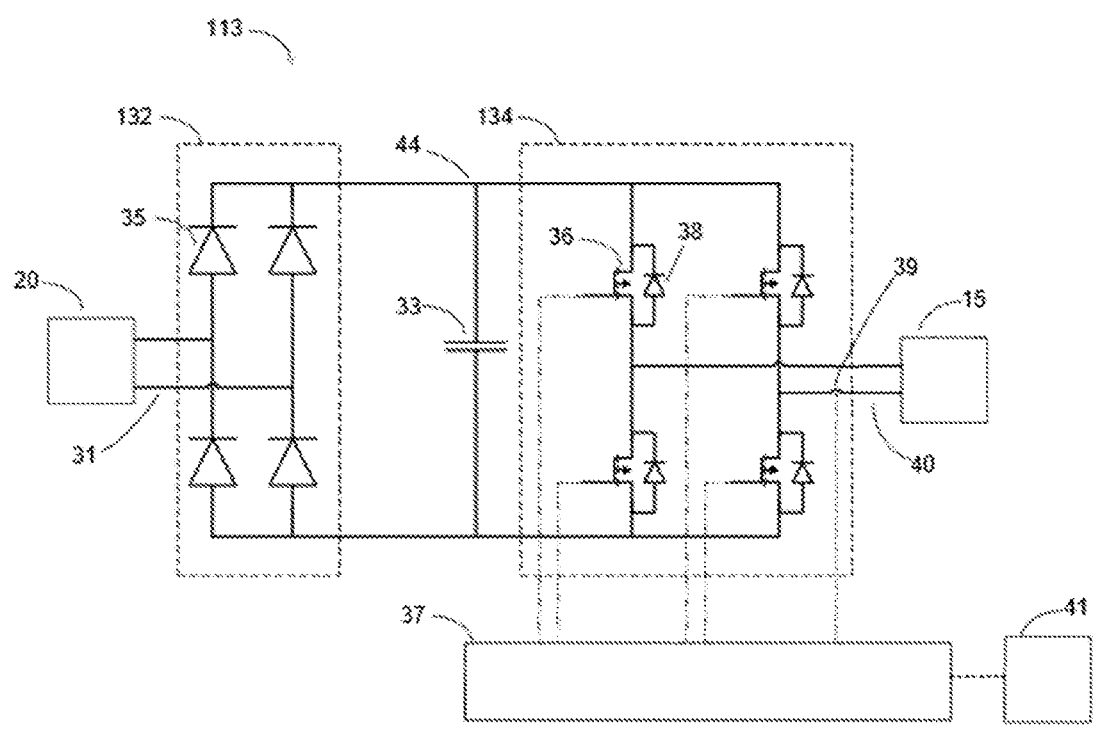
FIG. 5 illustrates the second embodiment of the controlled energy switching apparatus, object of the invention.

FIG. 5 shows a second embodiment of the controlled energy switching apparatus (113), object of this invention. The feeding is provided by connecting the voltage source at low voltage (20) to the input terminals (31).

The voltage source at low voltage (20), for this second embodiment, is a single-phase voltage source at low voltage.

The controlled energy switching apparatus (113) comprises a single-phase rectifier bridge (132) consisting of four diodes (35). The rectified voltage is filtered by a bank of multiple capacitors (33) and supplied to a single-phase inverter bridge (134) through a direct current bus (44).

The single-phase inverter bridge (134) comprises four controlled semiconductor switches (36) and four antiparallel diodes (38) connected to each controlled semiconductor switch (36). The single-phase inverter bridge (134) is connected to output terminals (40) to enable the connection to the low voltage auxiliary primary winding (15). The output current is measured by a current sensor (39), for monitoring and controlling by the controller of the energy switching apparatus (37).

The controller of the energy switching apparatus (37) generates the control signals for the four controlled semiconductor switches (36), and also receives control signals from the general controller (41) of the cascaded modular energy converter (10).

Figure 6:
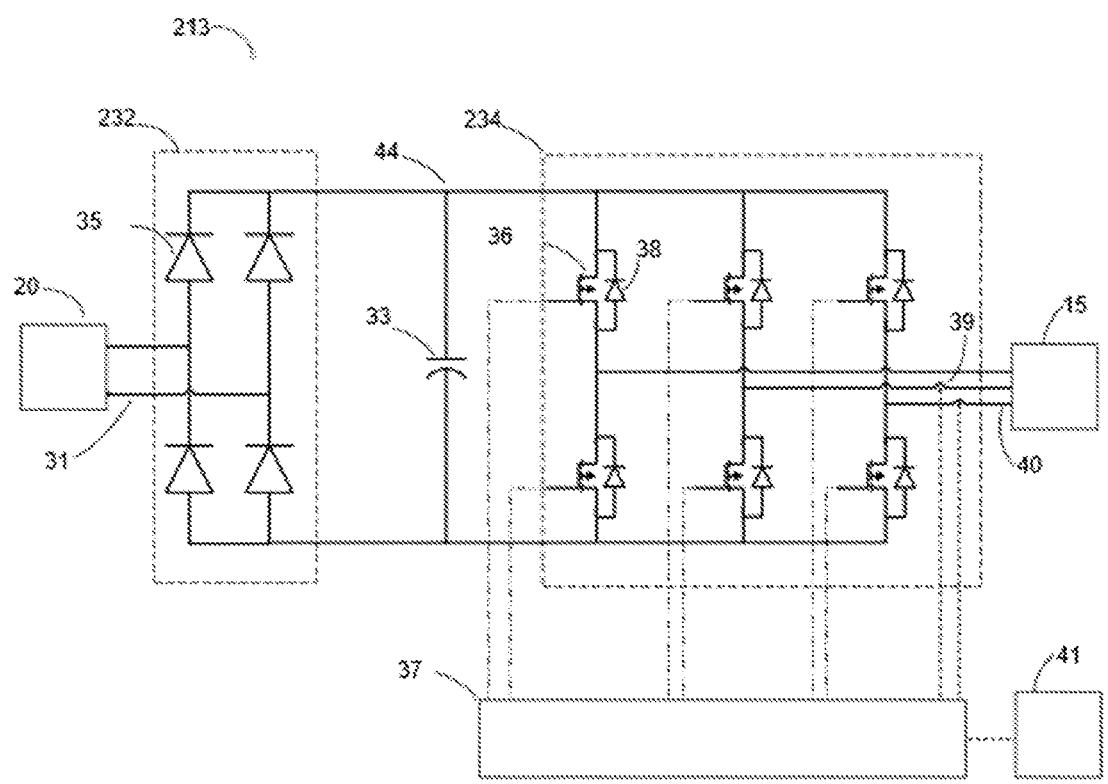
FIG. 6 illustrates the third embodiment of the controlled energy switching apparatus, object of the invention.

FIG. 6 presents a third embodiment of the controlled energy switching apparatus (213), object of this invention. The feeding is provided by connecting the voltage source at low voltage (20) to the input terminals (31).

The voltage source at low voltage (20), for this third embodiment, is a single-phase voltage source at low voltage.

The controlled energy switching apparatus (213) comprises a single-phase rectifier bridge (232) consisting of four diodes (35). The rectified voltage is filtered by a bank of multiple capacitors (33) and supplied to a three-phase inverter bridge (234) through a direct current bus (44).

The three-phase inverter bridge (234) comprises six controlled semiconductor switches (36) and six antiparallel diodes (38) connected to each controlled semiconductor switch (36). The three-phase inverter bridge (234) is connected to output terminals (40) to enable the connection to the low voltage auxiliary primary winding (15). The output current is measured by two current sensors (39), for monitoring and controlling by the controller of the energy switching apparatus (37).

The controller of the energy switching apparatus (37) generates the control signals for the six controlled semiconductor switches (36), and also receives control signals coming from the general controller (41) of the cascaded modular energy converter (10).

Figure 7:
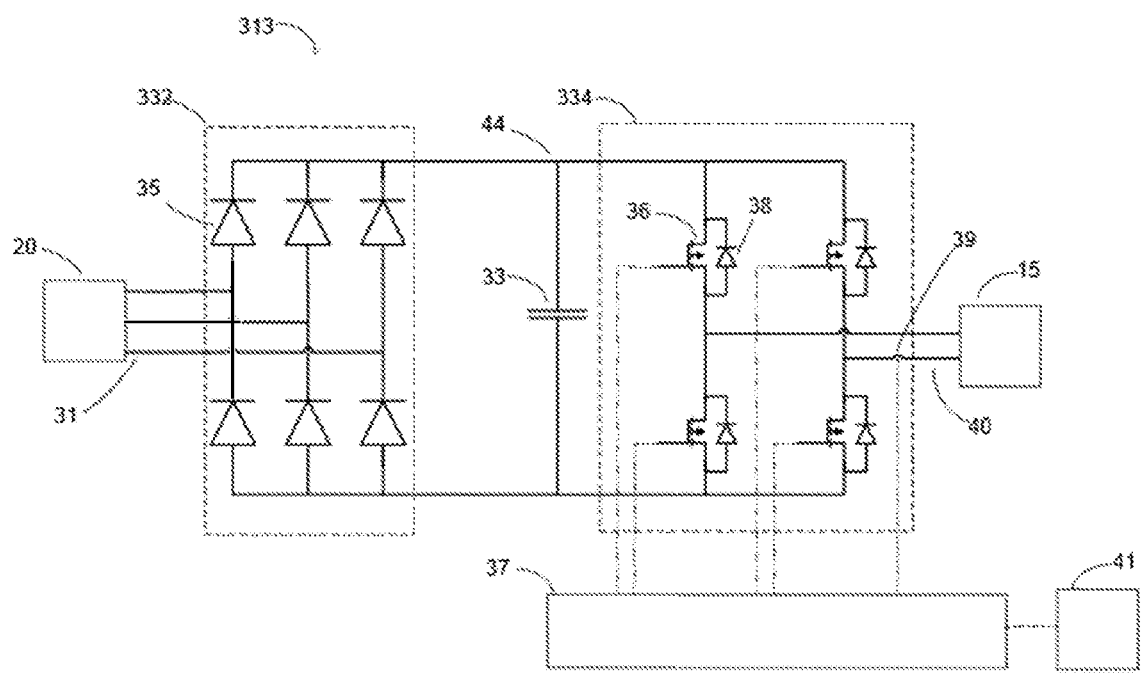
FIG. 7 illustrates the fourth embodiment of the controlled energy switching apparatus, object of the invention.

FIG. 7 presents a fourth embodiment of the controlled energy switching apparatus (313), object of this invention. The feeding is provided by connecting the voltage source at low voltage (20) to the input terminals (31).

The voltage source at low voltage (20), for this fourth embodiment, is a three-phase voltage source at low voltage.

The controlled energy switching apparatus (313) comprises a three-phase rectifier bridge (332) consisting of six diodes (35). The rectified voltage is filtered by a bank of multiple capacitors (33) and supplied to a single-phase inverter bridge (334) through a direct current bus (44).

The single-phase inverter bridge (334) comprises four controlled semiconductor switches (36) and four antiparallel diodes (38) connected to each controlled semiconductor switch (36). The single-phase inverter bridge (334) is connected to output terminals (40) to enable the connection to the low voltage auxiliary primary winding (15). The output current is measured by a current sensor (39), for monitoring and controlling by the controller of the energy switching apparatus (37).

Functioning of the Invention

The objective of the invention is to initialize the cascaded modular energy converter (10) through the energy supplied by a voltage source at low voltage (20).

A controlled energy switching apparatus (13, 113, 213, 313), object of the invention, is inserted between the voltage source at low voltage (20) and the low voltage auxiliary primary winding (15) of the multi-winding phase shift transformer (11), for the purpose of controlling and reducing the amplitude of the initialization current.

The general controller (41), which has a communication channel for initialization (43), communicates with the controller of the controlled energy switching apparatus (37), when the operation of the energy switching apparatus (13, 113, 213, 313) is requested, for initializing the cascaded modular energy converter (10).

The controlled energy switching apparatus (13, 113, 213, 313) receives the voltage at the input terminals (31), rectifies through the rectifier bridge (32, 132, 232, 332), filters through the bank of multiple capacitors (33) and provides direct current on the bus (44).

The controller of the controlled energy switching apparatus (37) generates command pulses for the inverter bridge (34, 134, 234, 334) of the controlled energy switching apparatus (13, 113, 213, 313), making available at the terminals output (40) a voltage of variable amplitude, characterized by varying from 0 to 100% of the rated value of the voltage of the low voltage auxiliary primary winding (15), and at a fixed frequency, greater than the nominal frequency of the multi-winding phase shift transformer (11), generating a flux in the ferromagnetic core (17).

With the use of a fixed frequency greater than the rated frequency of the multi-winding phase shift transformer (11), the impedance of the low voltage auxiliary primary winding (15) is virtually increased.

The flux in the ferromagnetic core (17) generates in the low voltage secondary windings (14) a voltage proportional to the amplitude of the voltage imposed by the inverter bridge (34, 134, 234, 334) to the low voltage auxiliary primary winding (15).

This induced voltage generated in the low voltage secondary windings (14) is rectified by the rectifier bridge (22) and stored in the multiple capacitor banks (23) of the various voltage cells (12) that make up the cascaded modular energy converter (10).

The voltage cell controller (28) measures and sends the voltage value of the multiple capacitor bank (23) to the general controller (41) of the cascaded modular energy converter (10). The voltage amplitude on the multiple capacitor banks (23) gradually increases until reaching the normal operating level of the various voltage cells (12). Through the voltage cell communication channel (42), the general controller of the converter (41) is informed of the moment when the voltage cell (12) has reached the operating voltage value, determining the end of the initialization period.

After the initialization of the various voltage cells (12) of the cascaded modular energy converter (10), the general controller (41) commands the shutdown of the energy switching apparatus (13, 113, 213, 313) and allows that the medium voltage main primary winding (16) is connected to the voltage source in alternating current at medium voltage (19), through a contactor or circuit breaker at medium voltage.

Additionally, depending on the need, it is possible with a voltage source at low voltage (20) with low current capacity to start up the cascaded modular energy converter (10), since the controlled energy switching apparatus (13, 113, 213, 313) through its controlled operation, and current monitoring by the current sensors (39), allows user-parameterized current levels to be drained from the voltage source at low voltage (20) for initialization of the cascaded modular energy converter (10).

For the operation of the cascaded modular energy converter (10), two sources of energy are necessary, that is, a voltage source in alternating current at medium voltage (19) and a voltage source at low voltage (20).

The voltage source in alternating current at medium voltage (19) is connected through a medium voltage contactor or circuit breaker to supply the cascaded modular energy converter (10) through the medium voltage main primary winding (16).

The voltage source at low voltage (20) is preferably in a voltage range between 127 V and 690 V.

It is important to emphasize that the description above has the sole purpose of describing in an exemplary way the particular embodiment of the invention in question. Therefore, it becomes clear that modifications, variations and constructive combinations of elements that perform the same function in substantially the same way to achieve the same results, continue within the scope of protection delimited by the attached claims.

The invention claimed is:

1. An initialization system for a cascaded modular energy converter (10) comprising at least one multi-winding phase shift transformer (11), the multi-winding phase shift transformer (11) comprising at least one low voltage auxiliary primary winding (15), at least one medium voltage main primary winding (16) and at least one low voltage secondary winding (14) mounted in a same ferromagnetic core (17) that feeds at least one voltage cell (12); the at least one voltage cell (12) being connected to at least one low voltage secondary winding (14) of the multi-winding phase shift transformer (11);

at least one voltage source at low voltage (20) connected to at least one controlled energy switching apparatus (13, 113, 213, 313) and connected to at least one low voltage auxiliary primary winding (15) and at least one general controller (41), which has an initialization communication channel (43) that communicates with a controller of the controlled energy switching apparatus (37);

the controlled energy switching apparatus (13, 113, 213, 313) provides a voltage with variable amplitude and frequency greater than the rated operating frequency of the multi-winding phase shift transformer (11) controlled by the general controller (41).

2. The initialization system according to claim 1, wherein the controller of the controlled energy switching apparatus (37) generates command pulses for an inverter bridge (34, 134, 234, 334) of the controlled energy switching apparatus (13, 113, 213, 313), providing a voltage of variable amplitude between 0 to 100% of the rated value of the voltage of the low voltage auxiliary primary winding (15).

3. The initialization system according to claim 1, wherein the controller of the controlled energy switching apparatus (37) generates command pulses for an inverter bridge (34, 134, 234, 334) of the controlled energy switching apparatus (13, 113, 213, 313), providing a voltage in alternating current at a fixed frequency greater than the rated frequency of the multi-winding phase shift transformer (11).

4. The initialization system according to claim 1, wherein the general controller (41) of the cascaded modular energy converter (10) determines the beginning and end of the operation of the controlled energy switching apparatus (13, 113, 213, 313) by a command over the communication channel for initialization (43).

5. The initialization system according to claim 1, wherein, during the working mode operation of the cascaded modular energy converter (10), the general controller (41) commands the operation of the multiple voltage cells (12) for controlling an electric motor in alternating current (18).

6. The initialization system according to claim 1, wherein the cascaded modular energy converter (10) comprises at least one voltage cell controller (28) that generates the control signals for controlled semiconductor switches (30).

7. The initialization system according to claim 1, wherein the controlled energy switching apparatus (13, 113, 213, 313) aggregates the monitoring of the initialization current through at least one current sensor (39).

8. The initialization system according to claim 1, wherein rated power of the voltage source at low voltage (20) for initialization is less than the rated power of the low voltage auxiliary primary winding (15) used in the initialization.

9. The initialization system according to claim 1, wherein the controlled energy switching apparatus (13) consists of input terminals (31), a three-phase rectifier bridge (32), comprising diodes (35); a bank of multiple capacitors (33), a direct current bus (44), a three-phase inverter bridge (34) comprising controlled semiconductor switches (36) and antiparallel diodes (38), connected to each controlled semiconductor switch (36); at least one current sensor (39) and output terminals (40).

10. The initialization system according to claim 1, wherein the controlled energy switching apparatus (113) consists of input terminals (31), a single-phase rectifier bridge (132), comprising diodes (35); a bank of multiple capacitors (33), a direct current bus (44), a single-phase inverter bridge (134) comprising controlled semiconductor switches (36) and antiparallel diodes (38), connected to each controlled semiconductor switch (36); at least one current sensor (39) and output terminals (40).

11. The initialization system according to claim 1, wherein the controlled energy switching apparatus (213) consists of input terminals (31), a single-phase rectifier bridge (232), comprising diodes (35); a bank of multiple capacitors (33), a direct current bus (44), a three-phase inverter bridge (234) comprising controlled semiconductor switches (36) and antiparallel diodes (38), connected to each controlled semiconductor switch (36); at least one current sensor (39) and output terminals (40).

12. The initialization system according to claim 1, wherein the controlled energy switching apparatus (313) consists of input terminals (31), a three-phase rectifier bridge (332), comprising diodes (35); a bank of multiple capacitors (33), a direct current bus (44), a single-phase inverter bridge (334) comprising controlled semiconductor switches (36) and antiparallel diodes (38), connected to each controlled semiconductor switch (36); at least one current sensor (39) and output terminals (40).

\* \* \* \* \*